May 23, 1967 F. FISCHER 3,320,851
PHOTOGRAPHIC TYPE PLACEMENT SYSTEM
Filed Oct. 8, 1964 4 Sheets-Sheet 1

INVENTOR.
FRANZ FISCHER
BY
ATTORNEY

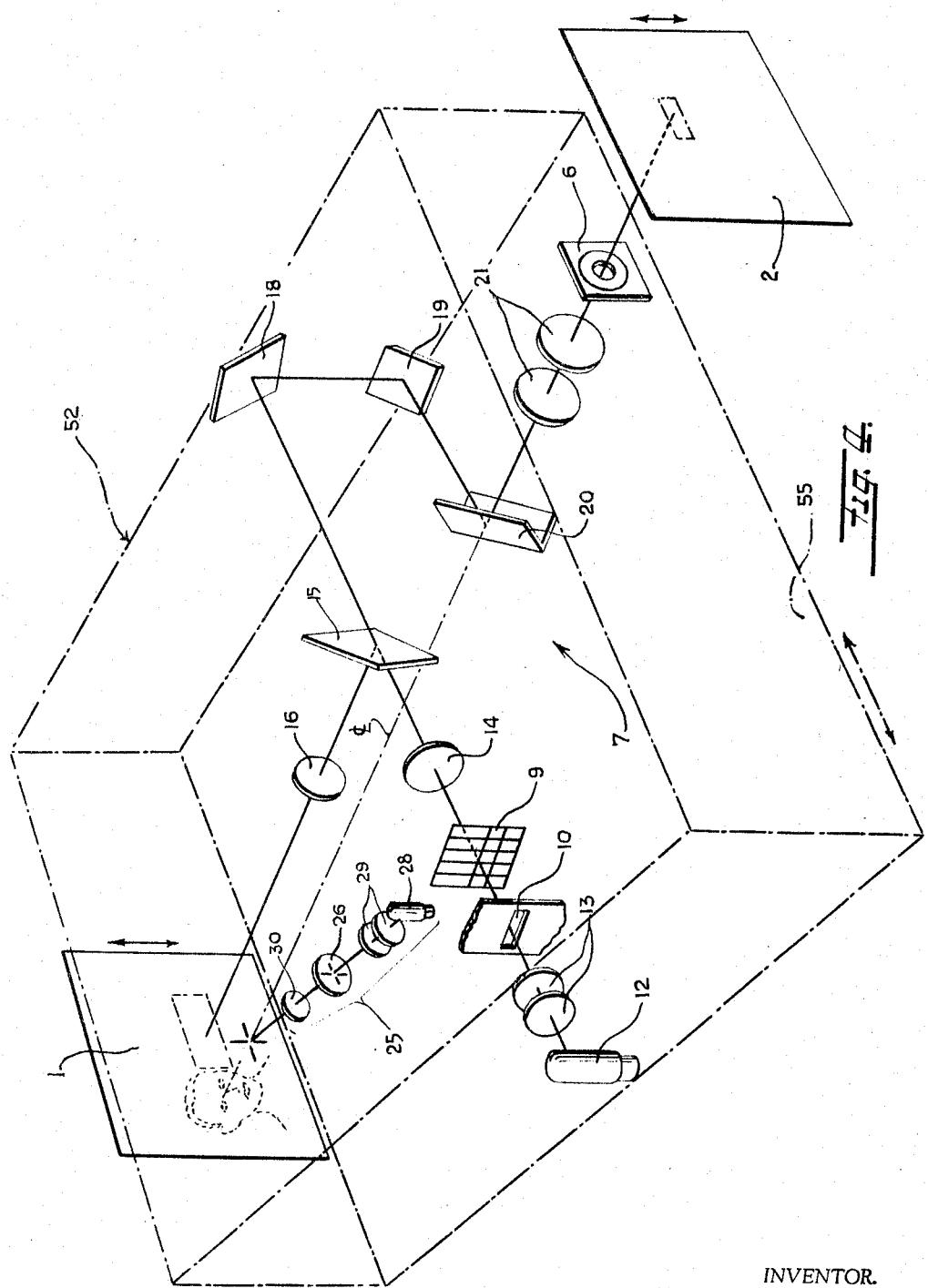

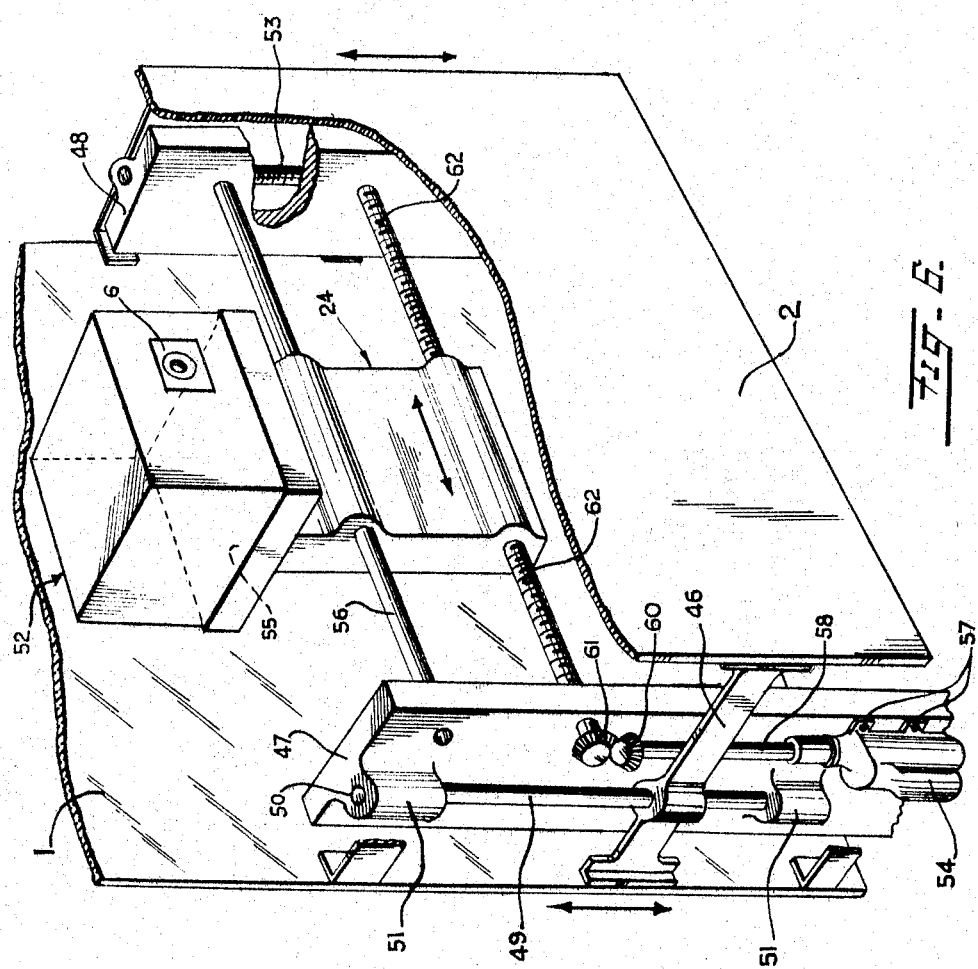

United States Patent Office 3,320,851
Patented May 23, 1967

3,320,851
PHOTOGRAPHIC TYPE PLACEMENT SYSTEM
Franz Fischer, Port Chester, N.Y., assignor to Eltra
Corporation, a corporation of New York
Filed Oct. 8, 1964, Ser. No. 402,486
3 Claims. (Cl. 88—24)

This invention relates to a photographic type placement apparatus, and more particularly to such an apparatus for placing numerals representative of elevations or depth soundings randomly on maps.

Oceanographic maps, for example, have a considerable number of soundings recorded thereon in random locations. The soundings, moreover, are subject to frequent alteration due to changing conditions of the ocean floor, and consequently the maps are often revised.

A present method of placing soundings and other designations on maps comprises the steps of first photographically recording the sounding data on strips of positive film and then pasting the strips at the appropriate locations on a previously prepared map. The map with the soundings pasted thereon is then photographed to give a negative of a map with soundings. This method is detailed and slow, and requires deep concentration on the part of the operator.

According to the present invention the soundings are mechanically located and photographically produced as a positive image on a film sheet which can then overlay the selected map and be photographed therewith to provide the desired map with soundings. Thus, the present invention contemplates the placement of all the desired data on a single sheet of film which is placed over a map to give a composite map and data.

In carrying out the invention, an apparatus is provided whereby a map having soundings or other data manually marked thereon in the exact position where such data is wanted can be placed over a translucent viewing screen. A film to receive the photographic record of the sounding or other data is mounted in another part of the apparatus but is adapted to move with the map as will hereinafter be described. A data projection system is also provided together with a keyboard for selecting the data to be recorded. The number representing the sounding is selected by manipulation of a keyboard and by means of an optical system presented to the transparent surface in full view of the operator on the manuscript map. A control mechanism allows the operator to arrange the projected data either vertically or horizontally so as to register the sounding directly with the sounding manually marked on the map. When properly registered the operator depresses an exposure button which automatically images the sounding on the film and prepares the system for the next keyboard entry. Upon completion of all sounding entries, the film is removed from the machine and developed to give a photographic positive of all soundings in a map area correctly located relative to one another and to some initial reference point. This positive film can then be overlayed on a clean copy of the map, i.e., a map without data thereon, and the two photographed to provide a photographic copy of a map with soundings thereon.

An important feature of the present invention resides in the fact that film and viewing planes are interconnected and therefore positioned in unison in a vertical direction while the optics and sounding selecting device are fixed vertically but only positionable horizontally. This arrangement is of utility in that an operator can perfectly align a sounding in a vertical direction without having to leave his seat located in front of the viewing plane. In other words, the sounding to be exposed can be directly presented to the operator at his viewing eye level.

Features and advantages of the invention will be gained from the foregoing and from the description of a preferred embodiment thereof which follows.

In the drawings:

FIG. 1 and FIG. 2 respectively show in block diagrammatic form a comparison between the prior art and the present method of putting soundings on maps;

FIG. 4 is a diagrammatic view of the optical system employed in the present invention;

FIG. 6 is a perspective view showing the interconnection between the film and the map mounting means and the drive mechanism for the same.

Figure 1:
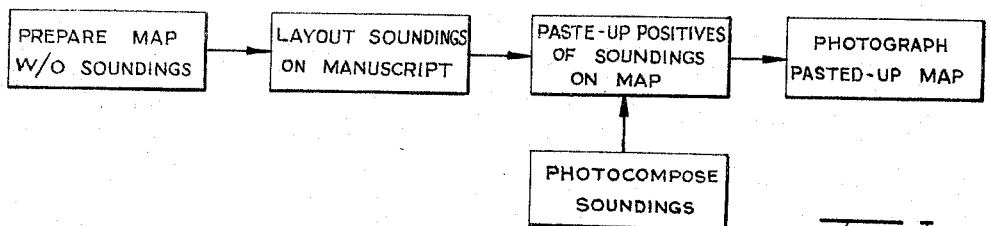
Figure 2:
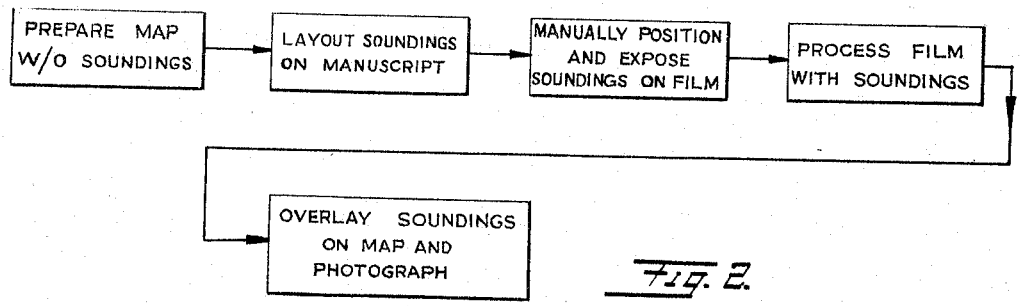

FIGS. 1 and 2 show, respectively, in block diagrams, a comparison between the prior art and the present method of providing soundings on oceanographic maps. The prior art employed a system where first a map of the area without soundings was prepared. Then the soundings were marked or layed out on the map. Information consisting of the sounding was then recorded on strips of photographic positive film and the film pasted at the precise locations marked on the map. Thereafter the pasted up map was photographed. In the present invention the manuscript copy of the map showing all outlines and indicating where the soundings are to be located is placed over a transparent front panel 1 of the apparatus so that it may be illuminated and viewed by the operator. A sheet of photographic film is mounted at 2 directly in back of the transparent panel at the rear of the apparatus. The sounding is entered by means of a keyboard 3 (FIG. 3) and automatically projected on to the transparent surface in full view of the operator. A control stick 4 (FIG. 3) then is used to move the projected image of the sounding to the desired location on the map. When the sounding image has been positioned, the operator will depress an "expose" button which will operate shutter 6 (FIG. 4) thereby projecting the sounding image to the film where it is recorded in the proper location. This procedure will be repeated until all of the desired soundings have been located on the map and exposed on the film. The shutter 6, as shown in FIGS. 4 and 6, may be mounted in the front wall of a box frame 52 used to house the optics of the present invention. Frame 52 is carried by a carriage 24 movable in only a horizontal relationship.

Upon the completion of all sounding entries, the film is removed from the system and developed to give a photographic positive of all the soundings in a map area correctly located relative to one another and to some initial reference point. This positive can then be overlayed on the basic map and the two photographed together to give a photographic copy of a map with soundings.

Figure 5A:
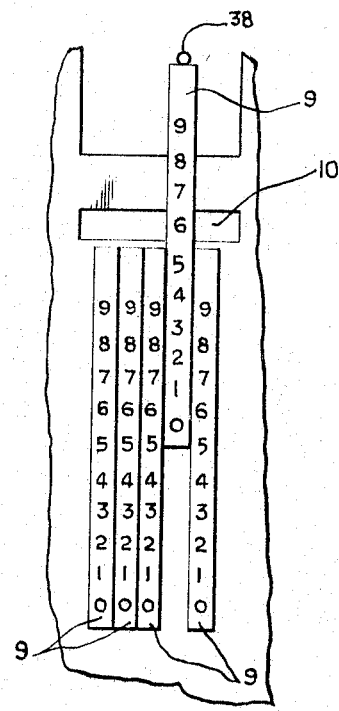
FIG. 5A is a fragmentary elevational view showing the glass slides of the slide positioning mechanism.

A schematic representation of the optical system 7 of the present apparatus is shown in FIG. 4. The system shown is effectively two separate optical systems, both being fixedly mounted on or adjacent to plane surface 55 (FIG. 4 and 6) of box frame 52 formed on carriage member 24; one to project an image on the viewing screen 1 and one to project an image on the film plane 2. The number corresponding to the sounding is selected by means of a selective orientation of glass slides 9. There are, as will be seen in FIG. 5A, five glass slides each of which has the numerals 0 through 9 imprinted thereon. When a sounding is entered into the machine through keyboard 3 (FIG. 3) the slides will automatically be positioned with respect to the optical system aperture 10 (FIGS. 4, 5A and 5B) in such a manner that only the proper soundings appears in the aperture. Illumination for the slides is supplied by a lamp 12 and a condenser 13 beneath the slides. Lens 14 is a collimator which directs light to a beam splitter 15. Beam splitter 15 can be a partially silvered mirror that reflects 90% and transmits 10% of the incident light. The light beam passes through lens 16 which focuses it to an image on the viewing plane 2. The effective focal length of lens 16 is equal to the effective focal length of lens 14. This will give an image on the viewing screen equal in size to that of the numeral on the glass slides. Of course, by selecting the focal lengths of lenses 14 and 16 accordingly, any desired size of image can be obtained. The light beam transmitted through beam splitter 15 is used to form an image on the film plane 1. This transmitted light beam is intercepted by plane mirrors 18 and 19 and roof mirror 20. The function of these mirrors is to obtain the proper orientation of the characters on the viewing and film planes with respect to each other. The light from the roof mirror 20 then passes through a zoom lens system 21. This system can be of a number of varieties provided only that it has the capability of varying the magnification of the characters selected by the glass slide containing mechanism 22 (FIG. 5A). It will be understood that the above described optical system 7 with all the mentioned elements are mounted on a carriage member 24, which as shown in FIG. 6 is capable of being moved only in a horizontal direction. In addition to mechanism 22 and the optical system 7 there is a projection system 25 (FIG. 4) mounted on carriage 24, which projects the image of a reticle 26 onto the viewing screen 2. This system includes lamp 28, condenser lens 29, reticle 26 and projection lens 30. This reticle is depicted as a pair of perpendicular lines with gaps at the center. It has been found that this configuration of reticle is easy to use when locating a specific point, but provision can be made for readily installing other types of reticles. As indicated by the center line CL the projected reticle is such that it indicates the exact center of the numeral that is to be projected to the film plane. The image projected by lens 16 is projected above the projected reticle center to avoid obstructing the image of the reticle while the sounding symbol projected on the film 2 is in exact registration with the projected position of the reticle on the film plane. As is quite clear, if the reticle is set so as to indicate the exact center of say a single digit then if more than one digit is to be placed on the film means should be provided to move the reticle in discrete amounts. These means are not shown but could take the form of any conventional indexing device.

Figure 3:
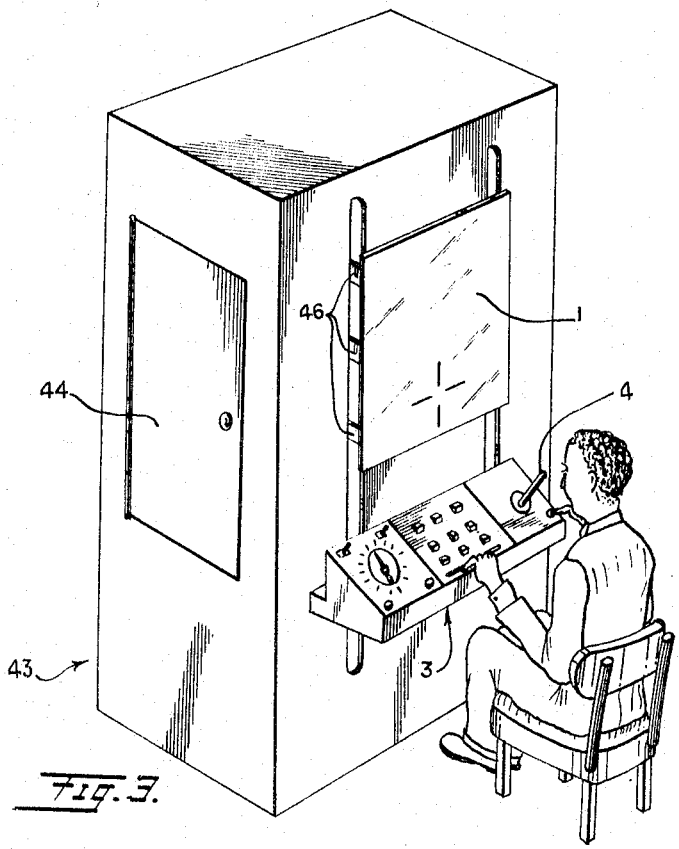
FIG. 3 illustrates the general configuration of the present invention.

Because of the exacting nature of map making, an image of maximum brightness is made available to the operator shown seated at the control keyboard of FIG. 3. This is done by using 90% of the light from lamp 12 to project an image onto the viewing screen 1 and only 10% to expose the film on plane 2. This will present a large, bright image to the operator and thereby make the identification and positioning task easier. The image and reticle will be bright enough to allow the system to be used without greater strain under normal office light. After the member taken from mechanism 22 is properly located the sounding exposure is accomplished by actuation of film shutter 6 which is normally closed to prevent light from accidentally reaching the film and exposing it. This shutter, which can be of a commercially available sort, is mounted on the front wall of frame 52 which is in turn carried by carriage 24 so that it moves with the optical system and shields the film until opened for exposure.

Figure 5B:
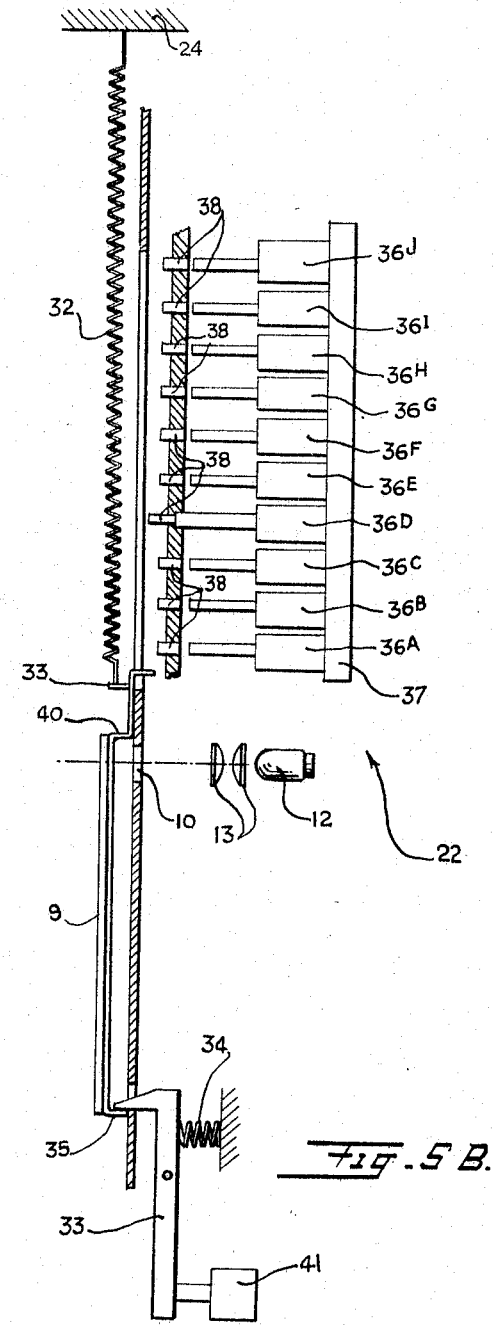
FIG. 5B is a side elevational view showing, in schematic form, the general arrangement of the slide positioning mechanism.

The following description outlines the method by which five glass slides 9 are positioned so as to arrange a given sounding within the apertured opening 10 of the optical system 7. Positioning of the slides as should be understood could be accomplished in a number of ways and so the following description will only be considered illustrative. FIG. 5B presents a schematic layout of the slide positioning mechanism 22. Each glass slide 9 carries the numerals 0 through 9 inclusive. A tension spring 32 has been provided for each slide and is fastened to carriage 24 and to a pin 33 fixed to the end of the slide. For the sake of clarity, the operation of one slide will be set forth as the others operate in exactly the same manner. At the opposite end of slide 9 (FIG. 5B) is a pivoted latch 33 biased by compression spring 34 to a position where it latches a catch portion 35 formed on slide 9. Before a number is selected the slide 9 is latched in this reset position. To select a digit of a sounding, the operator depresses the properly numbered keys on the keyboard 3 (FIG. 3). Depression of a key or push button causes two sets of contacts to close respectively energizing two solenoids. The first solenoid 36 ($a$–$j$), one of ten, is mounted on an indexing carriage 37 which in turn is mounted on carriage 24. Each of these ten solenoids corresponds to a number from 0 through 9. Since carriage 37 is capable of being indexed, only ten solenoids need be provided, as just before a new slide is to be operative carriage 37 with its solenoids need only be positioned in front of a new series of ten pins 38 which project into the path of slide 9. This action will now be set forth. When energized, say selected solenoid 36$d$ causes its associated pin 38 to move from its normal preset position to the position indicated in FIG. 5B. As shown, pin 38 corresponds to digit 6 (see FIG. 5A with the slide shown positioned); which means that slide 9 will be translated until its lip 40 engages pin 38, at which time the digit 6 will be presented to the aperture 10. So the action of the first solenoid energized raises one of ten pins from its normal position. The second solenoid 41, one for each of the five slides 9, causes the release of its associated slide. This is done by pivoting latch 33 against the bias of compression spring 34 thereby releasing the slide. The released slide translates upwardly under the urging of spring 32 until stopped by the selected pin 38 thereby positioning, for example, the selected digit 6 with respect to aperture 10 and the lamp 12. When the first slide 9 is released the solenoid carriage 37 indexes over to the next row of pins 38, ready for the next key stroke. It should be understood that there is a series of 10 fixed pins 38 for each slide 9 while only 10 solenoids are mounted on movable carriage 37. Each key actuation causes the same cycle until the entire sounding is selected. When the operator depresses the expose button, after the selected sounding was properly registered, the film will be exposed as shutter 6 is opened, after which the pins, slides and solenoids will reset to their original positions ready for a new sounding. The reset will be accomplished by a motor driven cam mechanism, not shown.

FIG. 6 shows a schematic representation of the manner in which a number selected at the optical system 7 is properly registered onto the film and viewing planes 2 and 1 respectively. The primary requirement is that the sounding number be accurately positioned onto the viewing and film planes; however, to prevent excessive operator fatigue the present invention brings the working portions of the viewing plane to the operator. Plane 1, made of a transparent material, on which the manuscript map is mounted in any convenient manner, is as shown in FIG. 3 outboard of a light tight cabinet 43 which forms the exterior shell of the machine and encloses the support and drive systems. This cabinet has access door 44 which allows for film loading and maintenance. FIG. 6 shows that the film plane 2 and the viewing plane 1 are rigidly connected by a series of rib members 46 connected to both vertical ends of the planes. The main support for the system are two side support members 47 and 48 which are supported in an absolutely fixed position. Member 47 carries a support bar 49 which engages and rides through holes 50 formed in a housing portion 51 of the rib members 46 so that the planes 1 and 2 are moved in unison in a vertical direction. Translation of both planes is accomplished by lead screw 53 rotatably mounted in member 48 and driven by a variable speed motor (not shown) capable of rotating in either a clockwise or counter clockwise manner. This engages and drives a threaded portion (not shown fixed to the ribs 46 adjacent member 48. The means for controlling the operation of both the vertical and horizontal drives is control stick 4 shown in FIG. 3 which allows an operator to actuate motor 54 for carriage 24 and the vertical drive motor not shown. If, for instance, it is required to locate a number near the top border of the map, the viewing and film planes will be translated vertically downwardly so as to permit the number to be projected at eye level. This feature is of considerable importance as it allows the selected sounding to be accurately registered. The feature dictates of course that the optical system and the carriage 24 upon which it is fixedly mounted (FIG. 6) is not capable of vertical movement. An advantage of this arrangement is that the operator need not get up from his seat to align the soundings in a vertical direction. Carriage 24 is provided with a box frame 52 which provides by means of its interior walls the mounting means for the optical system 7 and the projection system 25. The bottom surface 55 of box 52 provides the main mounting means for the optics of the present invention, as shown in FIG. 4, although not shown in FIG. 6. A guide bar 56 is fixed at its opposite ends in the two side support brackets 47 and 48 and runs through a hole bored in carriage 24. Bar 56 aligns carriage 24 so that the plane defined by surface 55 is perpendicular to both the viewing and film planes 1 and 2. Variable speed motor 54 is fixed by screws 57 to bracket 47 and drives shaft 58 provided with a bevel gear 60 at its remote end. This gear meshes with bevel gear 61 fixed to a projecting end of a lead screw 62 rotatably mounted in both brackets 47 and 48. This screw engages the carriage 24 and is capable of driving same in a horizontal manner either to the left or right depending upon the direction of rotation of shaft 58. Since the height of the projected image is at eye level, for horizontal alignment an operator need only move his head or chair sideways to follow the image projected onto plane 1.

Reviewing the procedure for putting down a typical sounding on a map will now be followed step by step. First, the power to lamp 12 of the optical system 7 is turned on. Next, the point size is chosen by manipulation of the zoom lens system 21. Now the keys corresponding to the sounding are depressed, operating the glass selection mechanism 22. Each key actuation presents the selected numeral to the viewing screen. The reticle 26 of course appears centered just below the selected numeral and the operator by means of a control lever 4 mounted on the keyboard 3 operates the vertical drive for the viewing and film planes and the horizontal drive controlling motor 54 for the carriage 24. When the reticle is correctly registered with the layed out sounding, the operator depresses an expose switch which in turn actuates shutter 6 and exposes the film to the projected sounding. This action clears the keyboard so that the next sounding can be entered into the system.

The invention has been shown described in preferred form only and it is apparent that many variations and modifications may be made therein without departing from the spirit and scope of the invention. It is understood, therefore, that the invention is not limited to any specific form or embodiment except insofar as such limitations are specified in the appended claims.

What is claimed is:

1. A photographic apparatus for preparing a film bearing sounding data imaged thereon in random positions but relative to each other in accordance with the desired positions of the data on an associated oceanographic map which film may then be overlayed on the associated map and the two photographed to provide a map with sounding data thereon, said apparatus comprising, in combination, a viewing screen to which a manuscript may be attached, an output film sheet holder, a data forming member including a plurality of individual slides each of which is positionable to bring a unit number into photographic position, means for positioning the individual slides so that a composite number representing a sounding datum is brought into photographic position, optical means for projecting an image of a composite number simultaneously onto a manuscript map mounted on said viewing screen and towards an output film sheet held on said sheet holder, means for moving said map and viewing screen and said output sheet holder in unison vertically whereby a desired portion of the manuscript map mounted on the viewing screen can be brought to a predetermined level, means for moving said data forming member and said projecting means horizontally whereby the selected numbers can be horizontally located in alignment with the corresponding manuscript notation on the map mounted on the viewing screen, and shutter means for exposing the output film to the projected composite number representing the sounding datum.

2. An apparatus according to claim 1 wherein said viewing screen and output film sheet holder are rigidly joined to each other in parallel relationship and wherein the optical means for projecting the selected numeral to the output film includes means for reversing the image so as to produce a right reading positive on the output film sheet.

3. An apparatus according to claim 1 wherein said optical means includes a projection system having a reticle and means for projecting said reticle onto said viewing screen adjacent to said projected number, whereby when said reticle is centrally located on a sounding marked on a map attached to said viewing screen, said projected number is in perfect registry on said output film sheet with said map sounding.

References Cited by the Examiner

UNITED STATES PATENTS

| | | | |
|---|---|---|---|
| 602,439 | 4/1898 | Friese-Greene | 95—4.5 |
| 3,007,369 | 11/1961 | Squassoni et al. | 88—24 |
| 3,116,661 | 1/1964 | Holland et al. | 88—24 |

NORTON ANSHER, *Primary Examiner.*

R. A. WINTERCORN, *Assistant Examiner.*